April 9, 1963

R. G. LARKIN 3,084,540

TORQUEMETER

Filed April 19, 1960

INVENTOR.
Robert G. Larkin
BY
*R. L. Spencer*
ATTORNEY

April 9, 1963 R. G. LARKIN 3,084,540
TORQUEMETER
Filed April 19, 1960 3 Sheets-Sheet 2

INVENTOR.
Robert G. Larkin
BY
C. L. Spencer
ATTORNEY

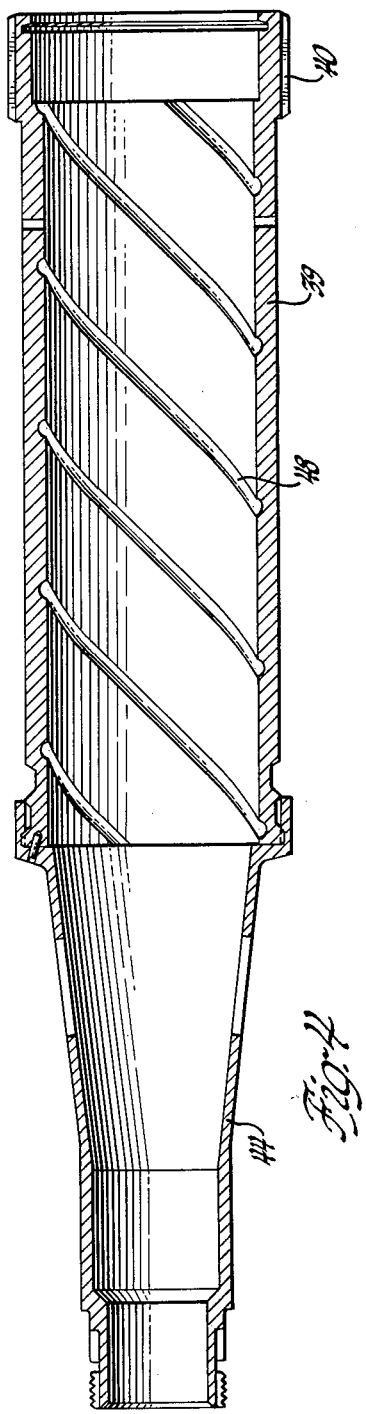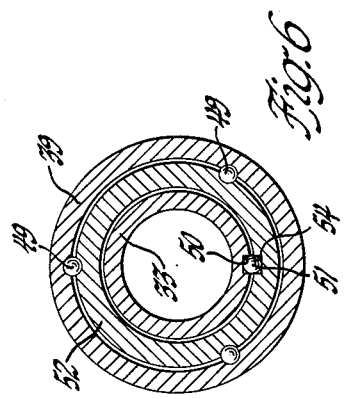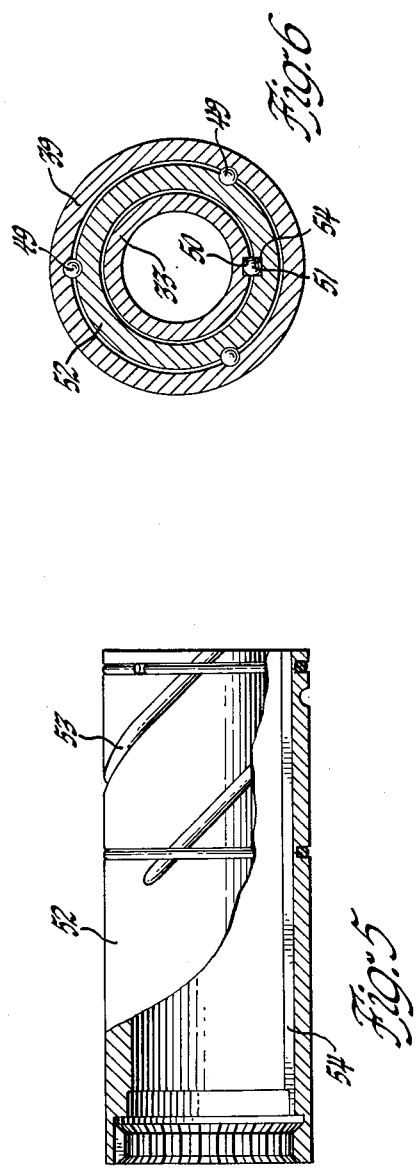

United States Patent Office 3,084,540
Patented Apr. 9, 1963

3,084,540
TORQUEMETER
Robert G. Larkin, Plainfield, Ind., assignor to General Motors Corporation, Detroit, Mich., a corporation of Delaware
Filed Apr. 19, 1960, Ser. No. 23,242
11 Claims. (Cl. 73—136)

This invention relates to torquemeters and more particularly to a mechanical torquemeter for measuring the torque transmitted through a rotating shaft.

An object of this invention is to provide a mechanical torquemeter disposed within a torque transmitting shaft supported for rotation in a housing wherein the torquemeter is arranged to provide an indicating motion external of the housing for indicating torque transmitted through the shaft.

Another object of this invention is to provide a mechanical torquemeter constructed and arranged to reduce internal friction within the torquemeter for accurate and sensitive measurement of torque.

A further object of this invention is to provide a mechanical torquemeter for measuring torque transmitted through a shaft wherein deflection within the torque transmitting shaft is converted to axial motion to indicate the torque transmitted through the shaft.

An additional object of this invention is to provide a mechanical torquemeter for indicating torque being transmitted through a hollow shaft wherein the torquemeter includes a deflection multiplying mechanism and means for converting angular rotation to axial motion all disposed within the torque transmitting shaft.

A further object of this invention is to provide a mechanical torquemeter including means responsive to angular deflection of a torque transmitting shaft for rotating a second shaft and means for converting rotation of the second shaft to axial motion wherein all of the elements of the mechanical torquemeter are disposed within and carried by the torque transmitting shaft.

These and other objects of this invention will be apparent from the following description and claims, taken in conjunction with the accompanying drawings, in which:

FIGURE 4 is an enlarged sectional view of a cylinder illustrating the spiral ball grooves on the internal surface of the cylinder.

FIGURE 5 is an enlarged partially sectional view of a coupling member illustrating spiral ball grooves on the external surface of the coupling member and straight ball splines on the internal surface of the coupling member.

FIGURE 6 is a sectional view taken along the line 6—6 of FIGURE 1.

Figure 1:
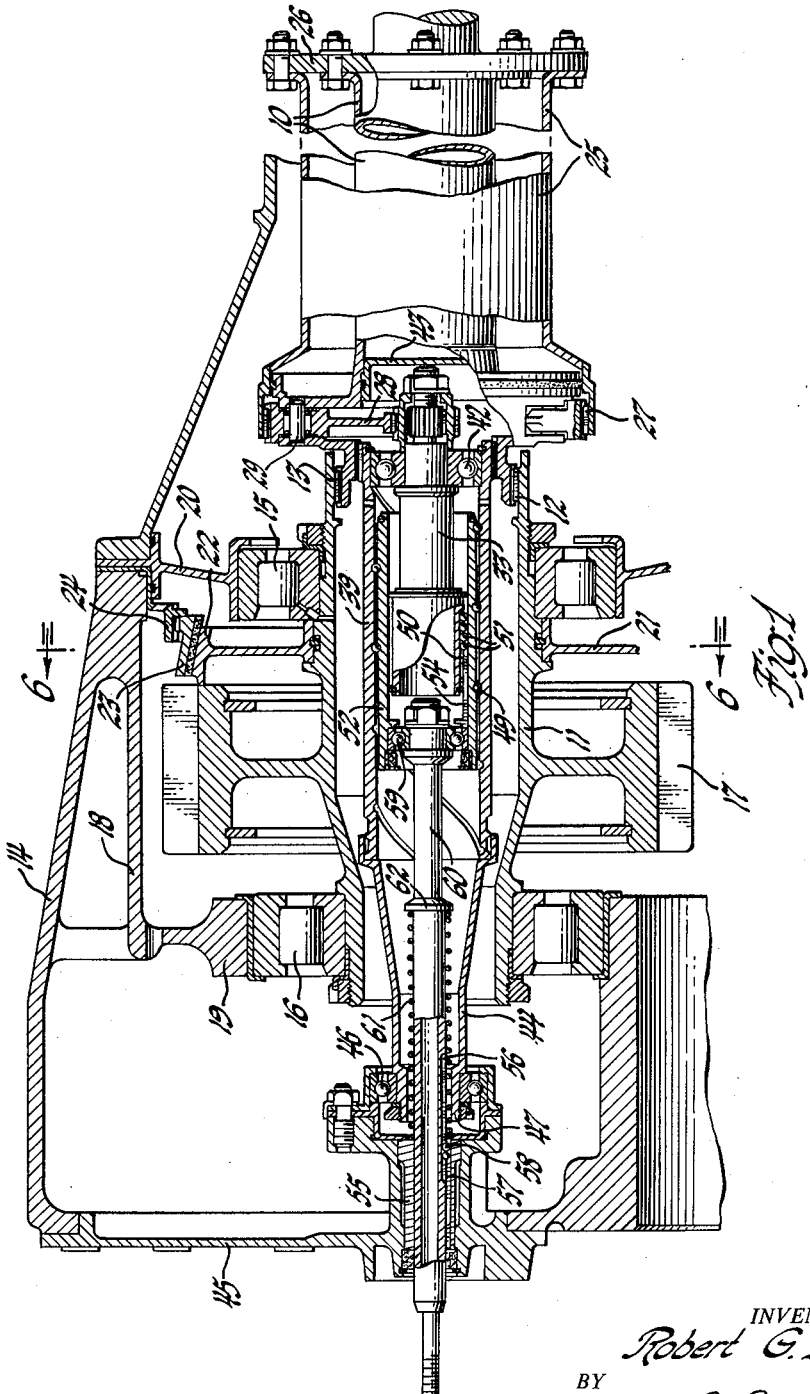
FIGURE 1 is a partially sectional view through a torquemeter assembly constructed in accordance with the principles of this invention.

Referring to FIGURE 1, there is shown an engine driven power input shaft 10 which is splined to a hollow sleeve shaft 11 by means of mating splines 12—13 on shafts 10 and 11, respectively, to drive the shaft 11. Shaft 11 is supported for rotation in a housing 14 by means of a pair of spaced bearings 15 and 16 disposed at opposite sides of a pinion gear 17 fixed to and driven by shaft 11. Housing 14 is reinforced adjacent gear 17 by means of an axially extending annular reinforcing web 18 positioned radially outwardly from gear 17 and by means of a radially inwardly extending annular boss 19 forming a seat for bearing 16. An annular pedestal 20 forms a seat for bearing 15. A brake unit consists of an annular drum 21 fixed to shaft 11 for rotation therewith having a conical surface 22 adapted to be engaged with a cone surface 23. Cone 23 is splined to a splined member 24 carried by housing 14 so as to be axially movable but nonrotatable. In the event that it is desired to stop free rotation of shaft 11, cone member 23 is moved axially to the left by suitable actuating mechanism (not shown) to engage the cone surfaces. Gear 17 drives a reduction gear box, not shown, which in turn may drive an aircraft propeller, not shown.

Figure 2:
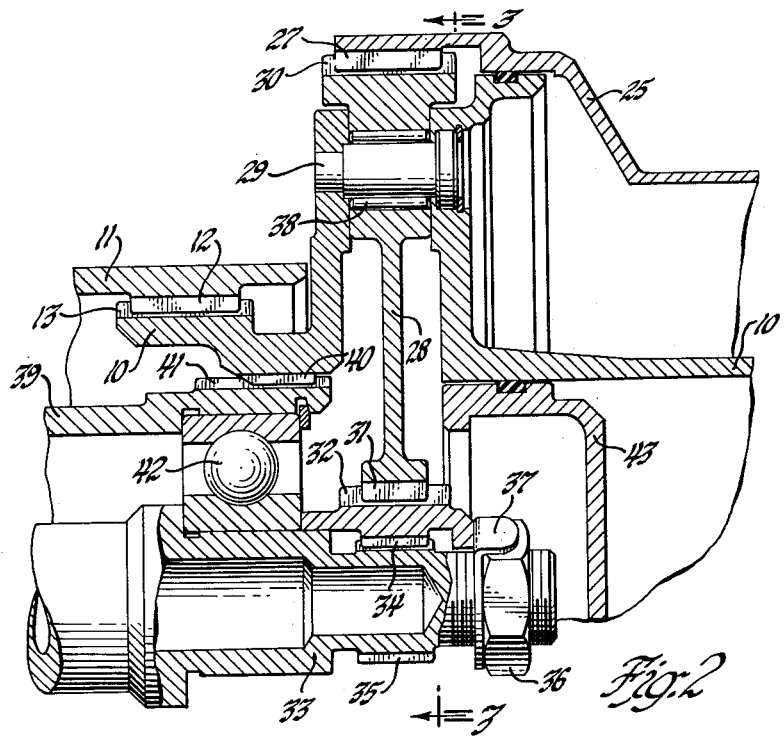
FIGURE 2 is an enlarged sectional view of the angular deflection multiplying mechanism.
Figure 3:
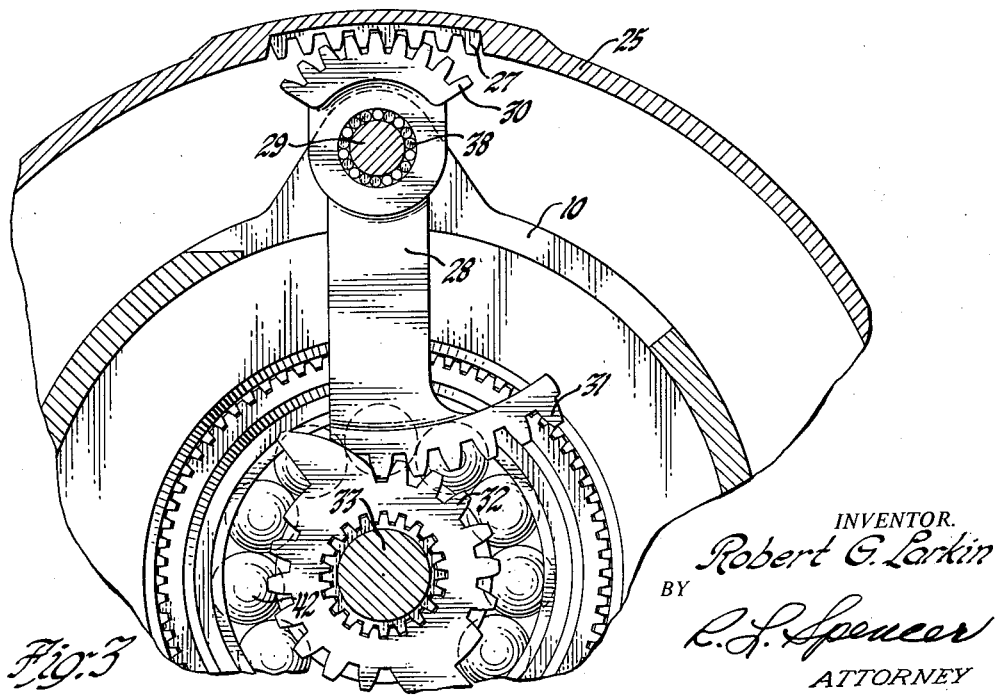
FIGURE 3 is a sectional view taken along the lines 3—3 of FIGURE 2.

A hollow reference shaft 25 is fixed to power input shaft 10 by means of a connection 26 so as to be rotatable with shaft 10, the shaft 25 having a ring gear 27 formed thereon. A deflection multiplying gear segment 28 is pivotally supported upon shaft 10 by means of a pin 29, the segment 28 having gear 30 in mesh with ring gear 27 and a gear sector 31 in mesh with a gear 32 splined to a shaft 33 by splines 34—35 as best shown in FIGURES 2 and 3. A nut 36 and lock-washer 37 detachably retain the gear 32 on shaft 33. Needle bearings 38 are disposed between sector 28 and pivot pin 29 to minimize friction. A cylinder 39 is splined to shaft 10 for rotation with shaft 10 by means of splines 40—41 on shaft 10 and the external surface of cylinder 39, respectively. A ball bearing 42 carried by cylinder 39 supports one end of shaft 33 in cylinder 39 with minimum friction. A cup-shaped plug member 43 is disposed in hollow drive shaft 10 adjacent the end of shaft 33 to provide an oil seal.

As shown in FIGURE 1, cylinder 39 carries an extension 44. An end plate 45 carried by housing 14 supports a ball bearing 46 which in turn supports the end of cylinder extension 44. A nut 47 is threaded upon the end of cylinder extension 44 so that bearing 46 prevents axial motion of cylinder 39. It will be apparent that cylinder 39 is rotatable by input shaft 10 but is fixed against axial motion. As shown in detail in FIGURE 4, cylinder 39 is provided with a series of helical splines 48 on its internal surface adapted to receive ball bearings 49 as shown in FIGURES 1 and 6. As shown in FIGURE 1 and particularly in FIGURE 6, shaft 33 carries a series of straight axially extending splines 50 on its external surface adapted to receive ball bearings 51.

Disposed within cylinder 39 and between the cylinder 39 and shaft 33 is coupling member 52 having a series of helical splines 53 on its external surface and a straight spline 54 on its internal surface, the splines being clearly shown in FIGURE 5. The ball bearings 51 are retained in the straight splines 50 of shaft 33 and 54 of coupling member 52 to reduce the friction between coupling member 52 and shaft 33. The ball bearings 49 are retained in the helical grooves 48 of cylinder 39 and 53 of coupling member 52 to reduce the friction between cylinder 39 and coupling member 52.

A hollow sleeve 55 carried by end plate 45 supports one end of a shaft 60 for axial motion, there being a series of straight splines 56 on sleeve 55 and a series of straight splines 57 on shaft 60. Suitable ball bearings 58 are disposed in the splines 56, 57 to reduce friction between axially movable shaft 60 and its support 55. The opposite end of shaft 60 is supported in coupling member 52 by means of a ball bearing 59 carried by the coupling member. Shaft 60 may constitute a signal shaft for indicating torque applied to gear 17 by virtue of its axial position exterior of end plate 45 or may be operably connected to adequate indicating mechanism (not shown) for readings at a position remote from the shaft.

In operation, the mechanical torquemeter converts the relative angular deflection of the torque transmitting shaft with respect to a reference shaft to an axial motion at a point outside the reduction gear drive housing. This axial motion can be sensed by a position indicator of well known construction to indicate the torque transmitted to the reduction gearing which drives a propeller. Outer cylinder member 39 is fixed against axial motion and carries the internal spiral ball track 48 with balls 49 therein. Coupling member 52 is provided with external spiral ball track 53 with balls 49 therein, and internal straight ball track 54 with balls 51 therein. The member 33 has straight ball track 50 with balls 51 therein, the shaft 33 in operation being rotated through a maximum of 90 degrees. Due to the load of the propeller and reduction gearing driven by torque transmitting shaft 10, the "wind up" or deflection of shaft 10 at maximum torque may be as high as 6 degrees. The initial deflection of shaft 10 at maximum torque will be 6 degrees. Assuming a 6 degree deflection within shaft 10, reference shaft 25 and ring gear 27 will function as a reaction member for gear segment 30 so that member 28 is caused to rotate about pin 29 on needle bearings 38 to rotate gear sector 31 and gear 32 carried by shaft 33. With a maximum 6 degree deflection in torque shaft 10, the shaft 33 will be caused to rotate through 90 degrees. Thus the gear segments multiply deflection occurring in shaft 10 in the ratio of 15 to 1. Since the cylinder member 39 is fixed to torque shaft 10, member 33 also rotates at 90 degrees with respect to cylinder 39. Since coupling member 52 is splined to shaft 33 by straight ball splines, the coupling member 52 also rotates at 90 degrees with respect to cylinder 39. With a 90 degree rotation of coupling member 52, the spiral ball track between coupling member 52 and cylinder 39 will cause the coupling member 52 to travel one inch in an axial direction with respect to cylinder 39. Signal shaft 60 supported by roller bearing 59 and balls 58 will move axially to the left or right with coupling member 52 in accordance with variation in torque transmitted by shaft 10. A spring 61 seated upon sleeve 55 and a spring seat 62 carried by shaft 60 yieldably biases the shaft 60 and coupling 52 for axial motion to the right in opposition to leftward thrust applied to coupling 52 through action of the ball splines. This assures that shaft 60 will return to its zero position when no torque is applied to shaft 10. The provision of the ball tracks with balls 49, 51 and 58 reduces resistance to axial motion to a minimum, thereby rendering the torque meter more accurate and sensitive to torque changes and reduces the possibility of erratic readings which might otherwise occur due to momentary friction binding of the splines. It is contemplated that the torquemeter will be used in connection with a very high speed engine such as a gas turbine engine so that shaft 10 and cylinder 39 will be rotating at a speed of the order of 9900 revolutions per minute or more. The particular design including the ball splines makes possible a highly accurate mechanical torquemeter wherein the torque transmitted through a high speed power section may be measured and read externally of the power section. The torquemeter is of compact construction and is arranged with the angular deflection multiplying mechanism and the mechanism for converting angular deflection to axial motion all disposed within the torque transmitting shaft.

I claim:

1. A torque measuring device for measuring torque transmitted by a power delivery shaft subject to angular deflection comprising a cylinder fixed for direct rotation with said power delivery shaft, a second shaft disposed for rotary motion in said cylinder, means for rotating said second shaft with respect to said cylinder proportional to the deflection of said power delivery shaft, a sleeve shaft positioned in said cylinder between said second shaft and said cylinder for axial motion with respect to said cylinder, and means cooperating with said second shaft and said cylinder for axially moving said sleeve shaft in response to rotation of said second shaft.

2. A torque measuring device for measuring torque transmitted by a power delivery shaft subject to angular deflection comprising in combination, a nonrotatable housing rotatably supporting said power delivery shaft, a cylinder disposed within said power delivery shaft and directly connected to said power delivery shaft for rotation therewith, a second shaft disposed within said cylinder and rotatable with respect to said cylinder, means responsive to angular deflection of said power delivery shaft for rotating said second shaft with respect to said cylinder, a coupling member disposed in said cylinder for axial motion with respect to said cylinder, an indicator shaft extending outwardly from said housing and axially movable in response to axial motion of said coupling member, and means operably connecting said coupling member to said second shaft and said cylinder for imparting axial motion to said coupling member proportional to the amount of rotation of said second shaft with respect to said cylinder.

3. A torque measuring device for measuring torque transmitted by a torque transmitting shaft subject to angular deflection comprising in combination, a nonrotatable housing rotatably supporting said torque transmitting shaft, a cylinder disposed within said torque transmitting shaft and directly rotatable with said shaft, a second shaft disposed within said cylinder and rotatable through a limited range of rotation with respect to said cylinder, a deflection multiplying device operably connecting said second shaft to said torque transmitting shaft for rotating said second shaft with respect to said cylinder in response to angular deflection of said torque transmitting shaft, a coupling member disposed within said cylinder between said cylinder and said second shaft, an indicator shaft connected to said coupling member for axial motion with said coupling member and extending outwardly through said housing, and means operably connecting said coupling member to said cylinder and said second shaft for imparting axial motion to said coupling member proportional to the angular rotation of said coupling member with respect to said cylinder.

4. A torque measuring device for measuring torque transmitted by a torque transmitting shaft subject to angular deflection comprising in combination, a cylinder fixed for rotation with said torque transmitting shaft, a second shaft disposed in said cylinder, means operably connecting said second shaft to said torque transmitting shaft for imparting limited angular rotation of said second shaft with respect to said cylinder in response to angular deflection of said torque transmitting shaft, a coupling member disposed in said cylinder between said cylinder and said second shaft, a series of spiral splines on the internal surface of said cylinder and the external surface of said coupling member, respectively, a plurality of roller balls disposed in said spiral splines, a series of straight splines in the external surface of said second shaft and the internal surface of said coupling member, a plurality of roller balls in said straight splines, said spiral splines and the balls therein being operable to provide axial motion of said coupling member in response to angular rotation of said second shaft with respect to said cylinder.

5. A torque measuring device for measuring torque transmitted by a torque transmitting shaft subject to angular deflection comprising a cylinder disposed in said torque transmitting shaft and directly rotatable therewith, a reference shaft rotatable with said torque transmitting shaft, a third shaft supported for rotation in said cylinder, means operably connecting said third shaft to both said reference shaft and said torque transmitting shaft for imparting limited angular rotation to said third shaft in response to angular deflection of said second shaft, a coupling member disposed in said cylinder between said cylinder and said third shaft, a straight spline connection between the external surface of said third shaft and the internal surface of said coupling member, and a spiral spline connection between the internal surface of said cylinder and the external surface of said coupling member, said spiral spline connection being effective to provide axial motion of said coupling member in response to rotation of said third shaft with respect to said torque transmitting shaft.

6. A torque measuring device for measuring torque transmitted by a torque transmitting shaft subject to angular deflection comprising, in combination, a cylinder disposed in said torque transmitting shaft and directly rotable therewith, a reference shaft rotatable with said torque transmitting shaft, a ring gear on said reference shaft, a sector supported upon said torque transmitting shaft for rotation with said torque transmitting shaft, said sector being pivoted on said torque transmitting shaft, a gear on said sector in mesh with said ring gear, a third shaft disposed in said cylinder for rotation with respect to said cylinder, a gear on said third shaft, a second gear on said sector in mesh with said gear on said third shaft, said ring gear, and said pivotally supported sector being effective to rotate said third shaft with respect to said cylinder upon angular deflection of said torque transmitting shaft, a coupling member disposed in said cylinder between said cylinder and said third shaft, means connecting said coupling member to said third shaft for rotation therewith, and means imparting axial motion to said coupling member in response to limited angular rotation of said coupling member by said third shaft.

7. A torque measuring device for measuring torque transmitted by a torque transmitting shaft subject to angular deflection, comprising, in combination, a reference shaft supported upon said torque transmitting shaft for rotation therewith, a ring gear on said reference shaft, a cylinder disposed within said torque transmitting shaft and rotatable therewith, a sector member carried by said torque transmitting shaft, means pivotally supporting said sector to said torque transmitting shaft, a gear on said sector in mesh with said ring gear, a third shaft disposed in said cylinder for limited rotation with respect to said cylinder, a gear fixed to said third shaft, an additional gear on said sector in mesh with said gear on said third shaft, said sector being effective to rotate said third shaft with respect to said torque transmitting shaft upon angular deflection of said torque transmitting shaft, a coupling member disposed in said cylinder between said cylinder and said third shaft, a straight ball spline connection between said third shaft and said coupling member, and a spiral ball spline connection between said cylinder and said coupling member, said ball spline connections being effective to impart limited axial motion to said coupling member in response to rotation of said third shaft by said sector.

8. A torque measuring mechanism for measuring torque transmitted by a torque transmitting shaft subject to angular deflection comprising, in combination, a reference shaft supported upon said torque transmitting shaft for direct rotation therewith, a cylinder disposed in said torque transmitting shaft for direct rotation therewith, a third shaft supported in said cylinder for limited angular rotation with respect to said cylinder, means within said torque transmitting shaft for imparting limited rotation to said third shaft in response to angular deflection of said torque transmitting shaft with respect to said reference shaft, a coupling member disposed within said cylinder between said cylinder and said third shaft, means connecting said coupling member to said third shaft for rotation therewith, and means between said cylinder and said coupling member for imparting axial motion to said coupling member upon rotation of said coupling member by said third shaft.

9. A torque measuring mechanism for measuring torque transmitted by a torque transmitting shaft subject to angular deflection comprising, in combination, a reference shaft fixed to said torque transmitting shaft for direct rotation therewith, a cylinder disposed within said torque transmitting shaft for direct rotation therewith, a third shaft disposed within said torque transmitting shaft, a bearing supporting said third shaft for rotation with respect to said cylinder, a ring gear on said reference shaft, a gear fixed to said third shaft for rotation therewith, a sector member pivotally supported upon said torque transmitting shaft and having gear sectors in mesh with said ring gear and said gear on said third shaft, said gears and sector being effective to rotate said third shaft in response to angular deflection of said torque transmitting shaft, a coupling member disposed in said cylinder for axial motion with respect to said cylinder, a ball spline connection between said third shaft and said coupling member for rotating said coupling member in response to rotation of said third shaft by said sector member, and a ball spline connection between said coupling member and said cylinder for imparting axial motion to said coupling member upon rotation of said coupling member by said third shaft.

10. A torque measuring device for measuring torque transmitted by a torque transmitting shaft subject to angular deflection comprising in combination, a housing fixed against rotation, bearing means supporting said torque transmitting shaft for rotation in said housing, a cylinder disposed within said torque transmitting shaft and rotatable therewith, bearing means supporting said cylinder on said housing, a second shaft disposed in said cylinder, bearing means between said second shaft and said cylinder, means operably connecting said second shaft to said torque transmitting shaft for imparting limited angular rotation of said second shaft with respect to said cylinder in response to angular deflection of said torque transmitting shaft, an axially movable coupling member disposed in said cylinder between said cylinder and said second shaft, a series of spiral splines on the internal surface of said cylinder and the external surface of said coupling member, respectively, a plurality of roller balls disposed in said spiral splines, a series of straight axially extending splines on the external surface of said second shaft and the internal surface of said coupling member, a plurality of roller balls in said straight splines, said spiral splines and the balls therein being operable to provide axial motion of said coupling member in response to angular rotation of said second shaft with respect to said cylinder.

11. A torque measuring device for measuring torque transmitted by a torque transmitting shaft subject to angular deflection comprising in combination, a housing fixed against rotation, bearing means supporting said torque transmitting shaft for rotation in said housing, a cylinder disposed within said torque transmitting shaft and rotatable therewith, bearing means supporting said cylinder on said housing, a second shaft disposed in said cylinder, bearing means between said second shaft and said cylinder, means operably connecting said second shaft to said torque transmitting shaft for imparting limited angular rotation of said second shaft with respect to said cylinder in response to angular deflection of said torque transmitting shaft, an axially movable coupling member disposed in said cylinder between said cylinder and said second shaft, a series of spiral splines on the internal surface of said cylinder and the external surface of said coupling member, respectively, a plurality of roller balls disposed in said spiral splines, a series of straight axially extending splines on the external surface of said second shaft and the internal surface of said coupling member, a plurality of roller balls in said straight splines, said spiral splines and the balls therein being operable to provide axial motion of said coupling member in response to angular rotation of said second shaft with respect to said cylinder, an indicator shaft supported in said housing for axial motion with respect thereto, and means connecting said indicator shaft to said coupling member for axial motion with said coupling member including a roller bearing for permitting said coupling member to rotate faster than said indicator shaft.

References Cited in the file of this patent

UNITED STATES PATENTS 670,324     Leverkus _____ Mar. 19, 1901

FOREIGN PATENTS 427,243     Italy _____ Nov. 17, 1947